United States Patent
Shin

(10) Patent No.: US 10,540,995 B2
(45) Date of Patent: Jan. 21, 2020

(54) ELECTRONIC DEVICE AND METHOD FOR RECOGNIZING SPEECH

(71) Applicant: Samsung Electronics Co., Ltd., Suwon-si, Gyeonggi-do (KR)

(72) Inventor: Ki-hoon Shin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/340,528

(22) Filed: Nov. 1, 2016

(65) Prior Publication Data
US 2017/0125037 A1 May 4, 2017

(30) Foreign Application Priority Data

Nov. 2, 2015 (KR) .......................... 10-2015-0153033

(51) Int. Cl.
*G10L 25/84* (2013.01)
*G10L 15/02* (2006.01)
(Continued)

(52) U.S. Cl.
CPC .............. *G10L 25/84* (2013.01); *G10L 15/02* (2013.01); *G10L 15/26* (2013.01);
(Continued)

(58) Field of Classification Search
CPC ......... G10L 24/84; G10L 15/02; G10L 15/26; G10L 21/0232
(Continued)

(56) References Cited

U.S. PATENT DOCUMENTS 5,774,851 A 6/1998 Miyashiba et al.
5,867,574 A * 2/1999 Eryilmaz ................. H04B 1/46
379/388.04
(Continued)

FOREIGN PATENT DOCUMENTS

EP 0735521 10/1995
JP 11-219193 8/1999
(Continued)

OTHER PUBLICATIONS

International Search Report and Written Opinion of the International Searching Authority dated Feb. 18, 2017 in International Patent Application No. PCT/KR2016/012427.

*Primary Examiner* — Jakieda R Jackson
(74) *Attorney, Agent, or Firm* — Staas & Halsey LLP

(57) ABSTRACT

An electronic device and a method for recognizing a speech are provided. The method for recognizing a speech by an electronic device includes: receiving sounds generated from a sound source through a plurality of microphones; calculating power values from a plurality of audio signals generated by performing signal processing on each sound input through the plurality of microphones and calculating direction information on the sound source based on the calculated power values and storing the calculated direction information; and performing the speech recognition on a speech section included in the audio signal based on the direction information on the sound source. As a result, the electronic device may correctly detect only a speech section from an audio signal while improving a speech section detection related processing speed.

13 Claims, 11 Drawing Sheets

(51) Int. Cl.
   *G10L 15/26* (2006.01)
   *G10L 21/0232* (2013.01)
   *G10L 25/21* (2013.01)
   G10L 21/0216 (2013.01)
   G10L 25/78 (2013.01)

(52) U.S. Cl.
   CPC .......... *G10L 21/0232* (2013.01); *G10L 25/21* (2013.01); *G10L 2021/02166* (2013.01); *G10L 2025/783* (2013.01)

(58) Field of Classification Search
   USPC .................................................. 704/248, 235
   See application file for complete search history.

(56) References Cited

U.S. PATENT DOCUMENTS

| | | | |
|---|---|---|---|
| 7,346,175 B2 * | 3/2008 | Hui ........................ | G10L 15/20 381/74 |
| 7,680,287 B2 | 3/2010 | Amada et al. | |
| 8,473,290 B2 | 6/2013 | Pi et al. | |
| 9,131,295 B2 * | 9/2015 | Kim ..................... | G10L 21/0272 |
| 9,159,320 B2 | 10/2015 | Hyun et al. | |
| 9,621,984 B1 * | 4/2017 | Chu ....................... | H04R 1/406 |
| 2002/0048376 A1 * | 4/2002 | Ukita ...................... | H04N 7/15 381/92 |
| 2002/0138254 A1 * | 9/2002 | Isaka ....................... | G10L 21/02 704/208 |
| 2003/0235295 A1 * | 12/2003 | He .......................... | H04B 3/23 379/406.01 |
| 2008/0077400 A1 * | 3/2008 | Yamamoto .............. | G10L 25/87 704/211 |
| 2010/0017205 A1 * | 1/2010 | Visser .................... | G10L 19/00 704/225 |
| 2011/0191102 A1 * | 8/2011 | Espy-Wilson ...... | G10L 21/0272 704/207 |
| 2012/0239394 A1 | 9/2012 | Matsumoto | |
| 2013/0073283 A1 * | 3/2013 | Yamabe .............. | G10L 21/0216 704/226 |
| 2015/0222996 A1 * | 8/2015 | Chu ....................... | H04R 25/40 381/313 |
| 2016/0064012 A1 * | 3/2016 | Endo ..................... | H04M 1/605 704/205 |
| 2016/0274212 A1 | 9/2016 | Rump | |

FOREIGN PATENT DOCUMENTS

| | | |
|---|---|---|
| JP | 2007-47088 | 2/2007 |
| JP | 2012-198289 | 10/2012 |
| KR | 10-0198019 | 6/1999 |
| KR | 10-0751921 | 8/2007 |
| WO | 2015/049199 | 4/2015 |

\* cited by examiner

ELECTRONIC DEVICE AND METHOD FOR RECOGNIZING SPEECH

CROSS-REFERENCE TO RELATED APPLICATIONS

This application claims priority from Korean Patent Application No. 10-2015-0153033, filed on Nov. 2, 2015 in the Korean Intellectual Property Office, the disclosure of which is incorporated herein by reference in its entirety.

BACKGROUND

1. Field

Apparatuses and methods consistent with the present disclosure relate to an electronic device and a method for recognizing a speech, and more particularly, to an electronic device and a method for detecting a speech section in an audio signal.

2. Description of the Related Art

A speech recognition technology controlling various kinds of electronic devices using a speech signal has been widely used. Generally, the speech recognition technology means a technology of understanding an intention of an uttered speech of a user from a speech signal input from hardware or software device or a system and performing an operation based on the understood intention.

However, the speech recognition technology recognizes various sounds generated from the surrounding environment as well as a speech signal for the uttered speech of the user and therefore may not correctly perform the intended operation of the user.

Therefore, various speech section detection algorithms for detecting only a speech section for an uttered speech of a user from an input audio signal have been developed.

As a general method for detecting a speech section, there are a method for detecting a speech section using energy for each audio signal in a frame unit, a method for detecting a speech section using zero crossing for each audio signal in a frame unit, a method for extracting a feature vector from an audio signal in a frame unit and detecting a speech section by determining existence and nonexistence of a speech signal from the pre-extracted feature vector using a support vector machine (SVM), or the like.

The method for detecting a speech section using energy of an audio signal in a frame unit or zero crossing uses energy or zero crossing for audio signals for each frame. As a result, the existing method for detecting a speech section has relatively smaller computation for determining whether the audio signals for each frame are the speech signal over other methods for detecting a speech section but may often cause an error of detecting a noise signal as well as the speech signal as the speech section.

Meanwhile, the method for detecting a speech section using a feature vector extracted from an audio signal in a frame unit and a SVM has more excellent detection accuracy for only the speech signal from the audio signals for each frame over the method for detecting a speech section using the foregoing energy or zero crossing but requires more computation to determine the existence and nonexistence of the speech signal from the audio signals for each frame and therefore may consume much more CPU resources over other methods for detecting a speech section.

SUMMARY

Additional aspects and/or advantages will be set forth in part in the description which follows and, in part, will be apparent from the description, or may be learned by practice of the embodiments.

Exemplary embodiments overcome the above disadvantages and other disadvantages not described above. Also, the embodiments are not required to overcome the disadvantages described above, and an exemplary embodiment may not overcome any of the problems described above.

The present disclosure correctly detects a speech section including a speech signal from an input audio signal in an electronic device.

The present disclosure inputs speech signals of a short distance and a far distance and detects a speech section based on sound direction tracking of the speech signals in the electronic device.

According to an aspect of the present disclosure, a method for recognizing a speech by an electronic device includes: receiving sounds generated from a sound source through a plurality of microphones; calculating power values of a plurality of audio signals generated by performing signal processing on each sound input through the plurality of microphones and calculating direction information on the sound source based on the calculated power values and storing the calculated direction information; and performing the speech recognition on a speech section included in the audio signal based on the direction information on the sound source.

In the performing of the speech recognition, the speech section may be detected based on audio signals corresponding to starting and ending points among the plurality of audio signals and the speech recognition may be performed on the detected speech section.

The storing may include: calculating a maximum power value and a minimum power value from the plurality of signal-processed audio signals; calculating a power ratio from the calculated maximum power value and minimum power value; determining at least one audio signal of which the calculated power ratio is equal to or more than a preset threshold value; and calculating the direction information on the sound source from a sound corresponding to the direction information included in the at least one audio signal determined and the at least one audio signal determined and storing the calculated direction information and an index for the at least one audio signal.

The storing may further include: comparing the minimum power value calculated from the plurality of audio signals with a pre-stored minimum power value to determine a power value having a smaller size as the minimum power value for the plurality of audio signals, if the minimum power value calculated from a previous audio signal is pre-stored.

The storing may further include: resetting a minimum power value calculated from an N-th audio signal to an initial value, if a predefined N-th audio signal is input.

In the calculating of the maximum power value and the minimum power value, $N*(N-1)/2$ power values may be calculated from the plurality of audio signals using a generalized cross-correlation phase transform (GCC-PHAT) algorithm and the largest value among the $N*(N-1)/2$ power values may be determined as the maximum power value, if the number of microphones is N, and the minimum power value is calculated from the plurality of audio signals using a minima-controlled recursive average (MCRA) algorithm.

The direction information may be angle information between sound direction of the sound source from which the sounds corresponding to each of the plurality of audio signals are generated and the plurality of microphones, and in the calculating of the maximum power value and the minimum power value, the direction information on the sound source from which the sounds corresponding to each of the plurality of audio signals are generated may be calculated from a delay value corresponding to the determined maximum power value.

In the performing of the speech recognition, the speech recognition may be performed on a speech section included in audio signals corresponding to at least two direction information if the at least two of the plurality of direction information is included in a preset error range or the error range of the two direction information is less than a preset threshold value.

The performing of the speech recognition may include: detecting the speech section from the audio signal based on the index for the at least one audio signal of which the power ratio is equal to or more than a preset threshold value; performing signal processing on the audio signal in the detected speech section based on the direction information on the sound source from which a sound corresponding to at least one audio signal of which the power ratio is equal to or more than a preset threshold value is generated; and performing the speech recognition from the signal-processed audio signal and transforming the speech into a text.

In the performing of the signal processing, the signal processing may be performed on the audio signal in the detected speech section using at least one of a beam-forming scheme including at least one of linearly constrained minimum variance (LCMA) and minimum variance distortion-less response (MVDR), a geometric source separation (GSS) scheme, and a blind source extraction (BSE) scheme.

According to another aspect of the present disclosure, an electronic device includes: an input receiving sounds generated from a sound source through a plurality of microphones; a memory storing direction information on the sound source; and a processor performing signal processing on each sound input through the plurality of microphones, calculating power values of a plurality of signal-processed audio signals, calculating direction information on the sound source based on the calculated power values and storing the calculated direction information in the memory, and performing the speech recognition on a speech section included in the audio signal based on the direction information on the sound source.

The processor may detect the speech section based on audio signals corresponding to starting and ending points among the plurality of audio signals and perform the speech recognition on the detected speech section.

The processor may calculate a maximum power value and a minimum power value from the plurality of signal-processed audio signals, calculate a power ratio from the calculated maximum power value and minimum power value, calculate the direction information on the sound source from a sound corresponding to at least one audio signal of which the calculated power ratio is equal to or more than a preset threshold value, and store the calculated direction information and an index for the at least one audio signal in a memory.

The processor may compare the minimum power value calculated from the plurality of audio signals with a pre-stored minimum power value to determine a power value having a smaller size as the minimum power value for the plurality of audio signals, if the minimum power value calculated from a previous audio signal is pre-stored in the memory.

The processor may reset a minimum power value calculated from an N-th audio signal to an initial value, if a predefined N-th audio signal is input.

The processor may calculate $N*(N-1)/2$ power values from the plurality of audio signals using a generalized cross-correlation phase transform (GCC-PHAT) algorithm, determine the largest value among the $N*(N-1)/2$ power values as the maximum power value, if the number of microphones is N, and calculate the minimum power value from the plurality of audio signals using a minima-controlled recursive average (MCRA) algorithm.

The direction information may be the angle information between sound direction of the sound source from which the sounds corresponding to each of the plurality of audio signals are generated and the plurality of microphones, and the processor may calculate the direction information on the sound source from which the sounds corresponding to each of the plurality of audio signals are generated from a delay value corresponding to the determined maximum power value.

The processor may perform the speech recognition on a speech section included in audio signals corresponding to at least two direction information if the at least two of the plurality of direction information is included in a preset error range or the error range of the two direction information is less than a preset threshold value.

The processor may detect the speech section from the audio signal based on the index for the at least one audio signal of which the power ratio is equal to or more than a preset threshold value, perform signal processing on the audio signal in the detected speech section based on the direction information on the sound source from which a sound corresponding to at least one audio signal of which the power ratio is equal to or more than a preset threshold value is generated, and perform the speech recognition from the signal-processed audio signal and transforms the speech into a text.

The signal processing may be performed on the audio signal in the detected speech section using at least one of a beam-forming scheme including at least one of linearly constrained minimum variance (LCMA) and minimum variance distortion-less response (MVDR), a geometric source separation (GSS) scheme, and a blind source extraction (BSE) scheme.

A computer program stored in a recording medium and combined with an electronic device to perform the following steps of: receiving sounds generated from a sound source through a plurality of microphones; calculating power values of a plurality of audio signals generated by performing signal processing on each sound input through the plurality of microphones and calculating direction information on the sound source based on the calculated power values and storing the calculated direction information; and performing the speech recognition on a speech section included in the audio signal based on the direction information on the sound source.

According to an aspect of the present disclosure, a non transitory computer readable storage stores a method, the method including receiving sound generated from a sound source via a plurality of microphones; calculating power values of a plurality of audio signals generated by performing signal processing on each sound input through the plurality of microphones; calculating direction information for the sound source based on the power values and storing the direction information; and performing speech recognition on a speech section included in an audio signal based on the direction information for the sound source.

According to an aspect of the present disclosure, a system, includes: a sound source; a plurality of microphones receiving sound produced by the sound source; a memory storing a direction of the sound source; and a computer processor calculating power values of audio signals from the microphones, calculating the direction of the sound source using the power values, storing the direction in the memory and performing speech recognition on a speech section of an audio signal responsive to the direction.

According to an aspect of the present disclosure, a system includes a sound source; an array of microphones receiving sound signals of sound produced by the sound source the microphones having one of different locations and different directionalities; and a computer processor calculating power values of sound signals from the array microphones, selecting an audio signal from the sound signals using the power values and corresponding different locations and different directionalities, and performing speech recognition on a speech section of the audio signal in a noisy environment.

According to an aspect of the present disclosure, a method includes: calculating power values of audio signals generated by microphones receiving sound from a sound source, calculating a direction of the sound source based on the power values and storing the direction, and identifying end points of a speech section responsive to an angle of the direction; and performing speech recognition on the speech section.

As described above, according to various exemplary embodiments of the present disclosure, the electronic device may correctly detect only the speech section from the audio signal while improving the processing speed for the speech section detection.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
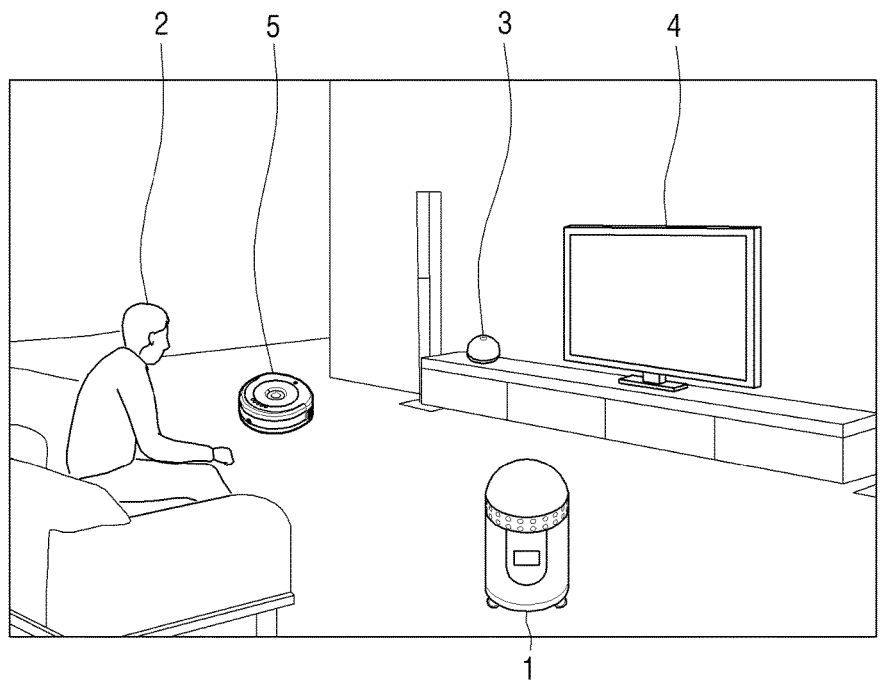
FIG. 1 is an exemplified diagram illustrating the environment in which an electronic device according to an exemplary embodiment of the present disclosure performs speech recognition.

Reference will now be made in detail to the embodiments, examples of which are illustrated in the accompanying drawings, wherein like reference numerals refer to the like elements throughout. The embodiments are described below by referring to the figures.

Prior to describing in detail the present disclosure, a description method of the present specification and drawings will be described.

First, terms used in the present specification and claims are selected as general terms in consideration of functions of various exemplary embodiments of the present disclosure. However, these terms may be changed depending on intention of a person in the art, legal or technical analysis, appearance of new technologies, or the like. Further, some terms may be arbitrarily selected by the present applicant. These terms may be analyzed as meaning defined in the present specification, and if terms are not defined in detail, the terms may also be analyzed based on the overall content of the present specification and general technology knowledge of the technical field in the art.

Further, like reference numerals or signs described in the respective drawings accompanying in the present specification represent parts or components performing substantially the same function. For convenience of explanation and understanding, other exemplary embodiments will be described using like reference numerals or signs. In other words, even though components having like reference numerals are all illustrated in a plurality of drawings, the plurality of drawings do not mean an exemplary embodiment.

Further, to differentiate between components in the present specification and claim, terms including ordinal numbers like "first", "second", or the like may be used. The ordinal numbers are used to differentiate like or similar components from each other and the meaning of the terms should not be restrictively analyzed by the use of the ordinal numbers. For example, a use order, a disposition order, or the like of components coupled to the ordinal numbers should not be limited by the numbers. If necessary, the respective ordinal numbers may also be used by being replaced by each other.

In the present specification, singular forms are intended to include plural forms unless the context clearly indicates otherwise. It will be further understood that the terms "comprises" or "have" used in this specification, specify the presence of stated features, numerals steps, operations, components, parts mentioned in this specification, or a combination thereof, but do not preclude the presence or addition of one or more other features, numerals, steps, operations, components, parts, or a combination thereof.

Further, in the exemplary embodiment of the present disclosure, the terms "module", "unit", "part", etc., are terms naming components for performing at least one function or operation and these components may be implemented as hardware or software or implemented by a combination of hardware and software. Further, the plurality of "modules", "units", "parts", etc., may be integrated as at least one module or chip to be implemented as at least one processor (not illustrated), except for the case in which each of the "modules", "units", "parts", etc., need to be implemented as individual specific hardware.

Further, in the exemplary embodiment of the present disclosure, when any portion is connected to other portions, this includes a direction connection and an indirect connection through other media. In addition, unless explicitly described otherwise, the meaning that any portion includes any components will be understood to imply the inclusion of other components but not the exclusion of any other components.

Hereinafter, various exemplary embodiments of the present disclosure will be described in detail with reference to the accompanying drawings.

FIG. 1 is an exemplified diagram illustrating the environment in which an electronic device according to an exemplary embodiment of the present disclosure performs speech recognition.

As illustrated in FIG. 1, an electronic device 100 (see FIG. 2 for details) for recognizing a speech performs speech recognition from a speech signal for an uttered speech of a user 2. The electronic device 100 for recognizing a speech may be peripheral devices such as a robot 1, TV 4, and a cleaner 5 in the house or a terminal device 3 that may control each of the peripheral devices such as the robot 1, the TV 4, and the cleaner 5.

The electronic device 100 may receive the speech signal for the uttered speech of the user 2 through a plurality of microphones that are installed in the electronic device 100 or receive the speech signal for the uttered speech of the user 2 from the plurality of microphones that are installed in the house.

Meanwhile, when there is noise generated from the surrounding environment like a sound of the TV 4 when a speech command is uttered, the electronic device 100 may receive a sound generated from a sound source that includes the speech signal for the uttered speech of the user 2 and a noise signal for noise generated from the surrounding environment through the plurality of microphones.

When receiving sounds generated from the sound source through the plurality of microphones, the electronic device 100 performs signal processing on each sound input through each of the microphones. Next, the electronic device 100 calculates power values of a plurality of signal-processed audio signals and determines a direction of the sound source based on the calculated power values. Next, the electronic device 100 performs the speech recognition by removing the noise signal from signal-processed audio data from the sound input through the determined direction of the sound source and detecting only the speech signal. Therefore, the electronic device 100 may improve the problem of wrongly recognizing the noise signal as the speech signal.

Meanwhile, the microphones that are installed in the electronic device 100 (see FIG. 2) or installed at different locations in the house may include a plurality of microphone arrays having directionalities and may receive the sound generated from the sound source including the speech signal for the uttered speech of the user 2 in various directions through the plurality of microphone arrays. As such, when the microphone includes the plurality of microphone arrays, the microphone that is installed in the electronic device 100 or installed in the house may have a single configuration.

Figure 2A:
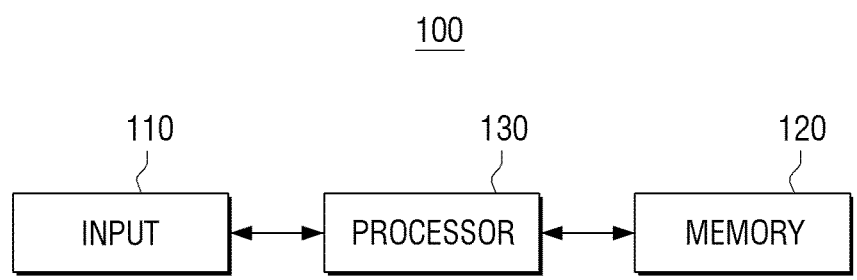
FIG. 2A is a schematic block diagram of the electronic device for recognizing a speech according to an exemplary embodiment of the present disclosure.
Figure 2B:
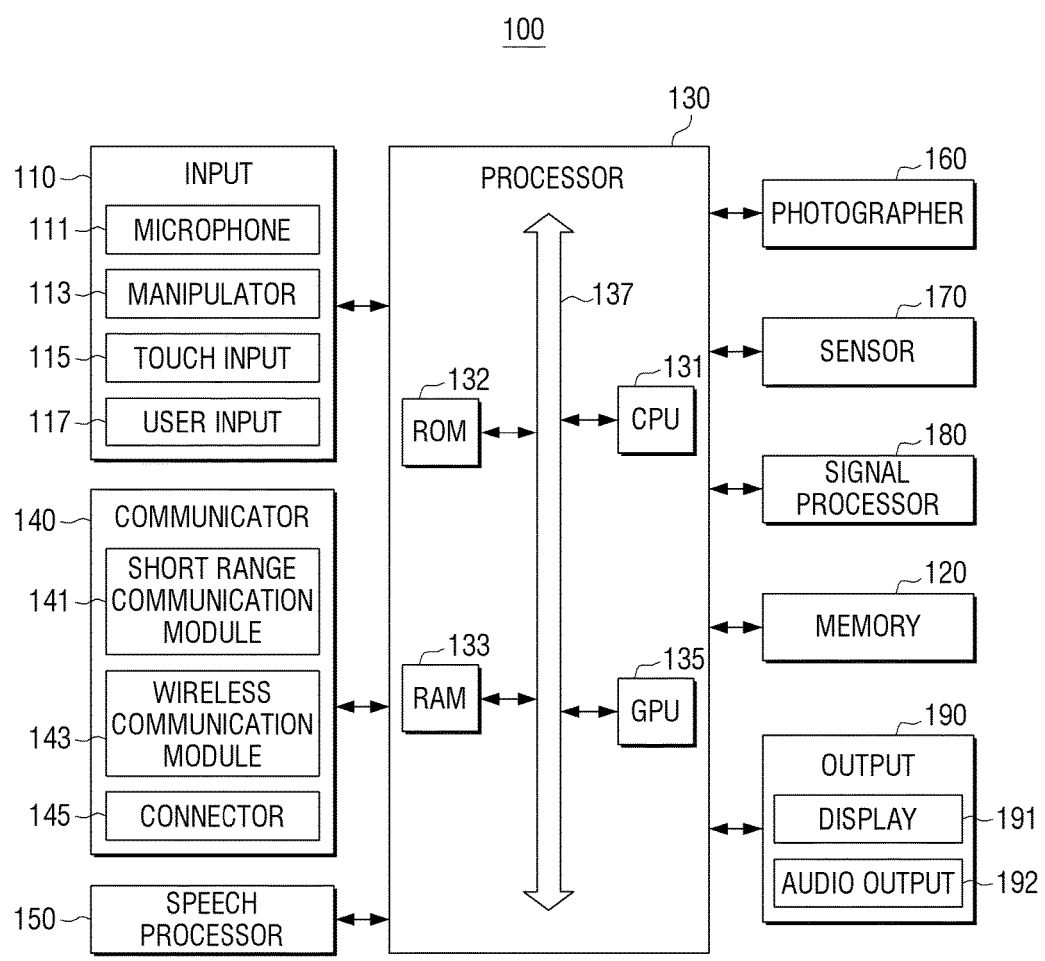
FIG. 2B is a detailed block diagram of the electronic device for recognizing a speech according to an exemplary embodiment of the present disclosure.

FIG. 2A is a schematic block diagram of the electronic device 100 for recognizing a speech according to an exemplary embodiment of the present disclosure and FIG. 2B is a detailed block diagram of the electronic device for recognizing a speech according to an exemplary embodiment of the present disclosure.

As illustrated in FIGS. 2A and 2B, the electronic device 100 is configured to include an input 110, a memory 120, and a processor 130.

As illustrated in FIG. 2B, the input 110 includes a plurality of microphones 111 and receives a sound generated from a sound source through a plurality of microphones 111.

However, the present disclosure is not limited thereto, and when the microphone 111 is configured in one, the corresponding microphone 111 may receive the sound generated from the sound source in various directions through the plurality of microphone arrays. Here, the sound source may include the speech signal for the uttered speech of the user and the noise signal for noise generated from the surrounding environment.

The memory 120 stores a direction or direction information for the sound source.

The processor 130 performs the signal processing on each sound input through the plurality of microphones 111 and calculates the power values of the plurality of signal-processed audio signals. Next, the processor 130 calculates the direction information on the sound source based on the calculated power values and stores the direction information on the calculated sound source in the memory 120. Next, the processor 130 performs the speech recognition on a speech section included in the audio signal based on the direction information on the sound source.

In detail, the processor 130 calculates a maximum power value and a minimum power value from each of the signal-processed audio signals if the signal-processed audio signals are input from each sound input through the plurality of microphones 111. Next, the processor 130 calculates a power ratio from the maximum power value and the minimum power value that are calculated from each of the audio signals. Next, the processor 130 compares the power ratio calculated from each of the audio signals with a preset threshold value and calculates the direction information on the sound source from the sound corresponding to at least one audio signal having the power ratio that is equal to or more than the preset threshold value. Next, the processor 130 stores the calculated direction information on the sound source and an index for at least one audio signal having the power ratio that is equal to or more than the preset threshold value in the memory 120.

Here, the index information is identification information on the audio signal and according to the exemplary embodiment of the present disclosure, may be information on time when the audio signal is input.

Next, the processor 130 detects the speech sections from the audio signals each corresponding to starting and ending points for the uttered speech of the user among the plurality of audio signals based on the direction information on the sound source and the index that are stored in the memory 120 and performs the speech recognition on the detected speech sections.

In detail, when receiving the sounds generated from the sound source through the plurality of microphones 111, the processor 130 performs the signal processing on each sound input through the plurality of microphones 111 as the audio signals. Next, the processor 130 may sample each of the signal-processed audio signals in L numbers and then generate the L sampled audio signals in a frame unit.

Next, the processor 130 calculates the maximum power value and the minimum power value from each of the plurality of audio signals and calculates the power ratio from the calculated maximum power value and minimum power value. Here, the maximum power value and the minimum power value may be a signal strength value for the audio signal. Therefore, the processor 130 may calculate the power ratio from the maximum power value having the largest signal strength value and the minimum power value having the smallest signal strength value among the plurality of audio signals.

Next, the processor 130 stores the direction information on the sound source from which the sound corresponding to at least one audio signal of which the power ratio calculated from the maximum power value and the minimum power value is equal to or more than the preset threshold value among the plurality of audio signals is generated and the index for at least one audio signal of which the power ratio is equal to or more than the preset threshold value in the memory 120.

According to the exemplary embodiment of the present disclosure, when the number of microphones 111 is N, the processor 130 calculates N*(N−1)/2 power values from the plurality of audio signals using generalized cross-correlation phase transform (GCC-PHAT) algorithm. Next, the processor 130 may determine the largest value among the calculated N*(N−1)/2 power values as the maximum power value.

For example, when the number of microphones 111 is two, the processor 130 may calculate one power value from the plurality of audio signals. In this case, the processor 130 may determine the calculated power value as the maximum power value. Meanwhile, when the number of microphones 111 is three, the processor 130 may calculate three power values from the plurality of audio signals and determine the largest value among the three power values as the maximum power value.

Meanwhile, the processor 130 may calculate the N*(N−1)/2 power values and delay values for each of the plurality of audio signals from the plurality of audio signals using the cross-correlation function like the following <Equation 1>. Here, the delay values for each of the plurality of audio signals may be the information on the time when the audio signals are differently input to each of the plurality of microphones 111 depending on a distance between the plurality of microphones 111.

$$R_{ij}(\tau) = \sum_{k=0}^{L-1} \frac{X_i(k) X_j(k)^*}{|X_i(k)||X_j(k)|} e^{j2\pi k J L} \qquad [\text{Equation 1}]$$

In the above Equation 1, i and j are the indexes for the audio signals input from the plurality of microphones 111 and $X_i(k)$ is a discrete Fourier transform (DFT) signal for an i-th audio signal input from a first microphone among the plurality of microphones 111. Further, $X_j(k)$ is a discrete Fourier transform (DFT) signal for a j-th audio signal input from a second microphone among the plurality of microphones 111. Further, ( )* represents a complex conjugate and k represents an index for a discrete frequency.

Meanwhile, according to the exemplary embodiment of the present disclosure, the cross-correlation function like the above <Equation 1> may be used as well as one of various whitening methods for increasing resolving power, a method for differently allocating weighting for each frequency, and a regularization method for preventing diffusion may be used in a form modified from the above <Equation 1>.

Meanwhile, the processor 130 may calculate the minimum power value from the plurality of audio signals using minima-controlled recursive average (MCRA) algorithm. Here, the generalized cross-correlation phase transform (GCC-PHAT) algorithm and the minima-controlled recursive average (MCRA) algorithm are the known technology, and therefore the detailed description of the present disclosure will be omitted.

Therefore, the processor 130 may calculate the power ratio from the maximum power value having the largest value among the power values calculated using the cross-correlation function like the above <Equation 1> and the minimum power value calculated using the MCRA algorithm.

Meanwhile, the processor 130 determines whether the minimum power value calculated from the previous audio signal is pre-stored in the memory 120, prior to calculating the power ratio from the maximum power value and the minimum power value. As the determination result, if the minimum power value is not pre-stored in the memory 120, the processor 130 may calculate the power ratio from the maximum power value having the largest value among the power values calculated using the cross-correlation function like the above <Equation 1> and the minimum power value calculated using the MCRA algorithm.

Meanwhile, if the minimum power value calculated from the previous audio signal is pre-stored in the memory 120, the processor 130 compares the minimum power value calculated from the plurality of audio signals currently input with the pre-stored minimum power value to select the minimum power value having a relatively smaller size. In detail, if the size of the pre-stored minimum power value is smaller than that of the minimum power value currently calculated, the processor 130 calculates the power ratio from the pre-stored minimum power value and the maximum power value calculated from the plurality of audio signals currently input.

Meanwhile, if it is determined that the size of the minimum power value currently calculated is smaller than that of the pre-stored minimum power value, the processor 130 updates the minimum power value pre-stored in the memory 120 to the minimum power value calculated from the plurality of audio signals currently input. Next, the processor 130 may calculate the power ratio from the maximum power value and the minimum power value that are calculated from the plurality of audio signals currently input.

Meanwhile, the processor 130 performs the update of the minimum power value only before the sound corresponding to the pre-stored K-th audio signal is input. That is, if the sound corresponding to the pre-stored K-th audio signal is input, the processor 130 may reset the minimum power value calculated from the K-th audio signal to an initial value and store the initial value in the memory 120.

Meanwhile, if a sound corresponding to a K+1-th audio signal is input, the processor 130 calculates the power ratio from the maximum power value and the minimum power value calculated from the K+1-th audio signal. Further, the processor 130 compares the minimum power value of the K+1-th audio signal with the minimum power value of the K-th audio signal reset to the initial value. As the comparison result, if it is determined that the minimum power value of the K+1-th audio signal is small, the processor 130 updates the minimum power value pre-stored in the memory 120 to the minimum power value of the K+1-th audio signal and if it is determined that the minimum power value of the K+1-th audio signal is large, the processor 130 keeps the minimum power value pre-stored in the memory 120.

Meanwhile, if the power ratio is calculated from the plurality of audio signals by the foregoing performance operation, the processor 130 compares each power ratio with the preset threshold value to store the direction information on the sound source from which the sound corresponding to at least one audio signal having the power ratio that is equal to or more than the preset threshold value is generated and the index for at least one audio signal having the power ratio that is equal to or more than the preset threshold value in the memory 120. Therefore, if the direction information on the sound source from which the sound corresponding to at least one audio signal is generated and the index are stored in the memory 120, the processor 130 may determine the starting and ending points of the speech section included in the audio signal based on the direction information on the sound source stored in the memory 120. According to the exemplary embodiment of the present disclosure, when the direction information on the plurality of sound sources is stored in the memory 120, the processor 130 may determine each of the audio signals corresponding to at least two direction information as the audio signals of the starting and ending points if at least two direction information on the plurality of sound sources is included in the preset error range or the error range of the at least two direction information is less than the preset threshold value.

Here, the direction information is the angle information between the sound direction of the sound sources from which the sounds corresponding to the plurality of audio signals are generated and the plurality of microphones 111. Therefore, the processor 130 may calculate the angle information that is the direction information on the sound sources from which the sounds corresponding to the plurality of audio signals are generated from the delay value calculated by the above <Equation 1> and the memory 120 may store the angle information on the plurality of audio signals of which the power ratio equal to or more than the preset threshold value is calculated and the index for the corresponding audio signal.

Therefore, the processor 130 may determine whether each angle information on each of the plurality of audio signals pre-stored in the memory 120 belongs to the preset error range to acquire the angle information included in the preset error range. If at least two angle information included in the preset error range is acquired, the processor 130 determines the audio signal corresponding to the acquired angle information as a speech signal of a static sound source.

Meanwhile, if a difference in the angle information on each of the first and second audio signals among the plurality of pre-stored audio signals does not belong to the preset error range, the processor 130 compares a difference value in the angle information on each of the first and second audio signals with the preset threshold value. As the comparison result, if the difference value in the angle information on each of the first and second audio signals is less than the preset threshold value, the processor 130 determines the first and second audio signals as a speech signal of a dynamic sound source.

If it is determined that at least two of the plurality of audio signals pre-stored in the memory 120 are the speech signal by the various analyses, the processor 130 may determine each of at least two audio signals determined as the speech signal as the audio signals of the starting and ending points.

If at least two audio signals are determined as the audio signals of the starting and ending points, the processor 130 may detect the speech sections based on the indexes for the audio signals determined as the starting and ending points. If the speech sections are detected, the processor 130 performs the signal processing on the audio signals included in the speech sections based on the direction information on the sound sources for the audio signals determined as the starting and ending points.

In detail, the processor 130 may perform signal processing to amplify the signal-processed audio signal from the sound input from the corresponding direction based on the direction information on the sound sources for the audio signals determined as starting and ending points among the audio signals included in the speech sections and attenuate the audio signals in the rest directions.

According to the exemplary embodiment of the present disclosure, the processor 130 may perform signal processing to amplify the audio signal in the direction corresponding to the direction information on the sound sources for the audio signals determined as the starting and ending points from the audio signal in the previously detected speech section and attenuate the audio signals in the rest directions by at least one of a beam-forming scheme including at least one of linearly constrained minimum variance (LCMA) and minimum variance distortion-less response (MVDR), a geometric source separation (GSS) scheme, and a blind source extraction (BSE) scheme.

Next, the processor 130 performs the speech recognition from the audio signal in the signal-processed speech section and transforms it into a text. According to the exemplary embodiment of the present disclosure, the processor 130 may perform the speech recognition from the audio signal in the signal-processed speech section using a speech to text (STT) algorithm and transform it into a text form.

Meanwhile, as illustrated in FIGS. 2A and 2B, the foregoing input 110 may include a plurality of microphones 111, a manipulator 113, a touch input 115, and a user input 117. The plurality of microphones 111 output the uttered speech of the user or audio signals generated from other living environments to the processor 130.

The manipulator 113 may be implemented as a key pad including various function keys, a numeric key, a special key, a character key, or the like and when a display 191 to be described below is implemented in a touch screen form, the touch input 115 may be implemented as a touch pad having a mutual layer structure with the display 130. In this case, the touch input 115 may receive a touch command for an icon displayed through the display 191 to be described below.

The user input 117 may receive an IR signal or an RF signal from at least one peripheral device (not illustrated). Therefore, the foregoing processor 130 may control an operation of the electronic device 100 based on the IR signal or the RF signal that is input through the user input 117. Here, the IR or RF signal may be a control signal or a speech signal for controlling the operation of the electronic device 100.

Meanwhile, the electronic device 100 according to the exemplary embodiment of the present disclosure may further include various components besides the input 110, the memory 120, and the processor 130 that are described above.

According to the exemplary embodiment of the present disclosure, when the electronic device 100 is implemented as display devices such as a smart phone and a smart TV, as illustrated in FIGS. 2A and 2B, the electronic device 100 may further include a communicator 140, a speech processor 150, a photographer 160, a sensor 170, a signal processor 180, and an output 190.

The communicator 140 performs data communication with at least one peripheral device (not illustrated). According to an exemplary embodiment of the present disclosure, the communicator 140 may transmit the speech signal for the uttered speech of the user to a speech recognition server (not illustrated) and receive a speech recognition result in a text form that is recognized from the speech recognition server (not illustrated). According to another exemplary embodiment of the present disclosure, the communicator 140 may perform data communication with a web server (not illustrated) to receive content corresponding to a user command or a content related search result.

As illustrated in FIGS. 2A and 2B, the communicator 140 may include a short range communication module 141, a wireless communication module 143 such as a wireless LAN module, and a connector 145 including at least one of wired communication modules such as a high-definition multimedia interface (HDMIsh), a universal serial bus (USB), Institute of Electrical and Electronics Engineers (IEEE) 1394.

The short range communication module 141 is configured to wirelessly perform short range communication between the portable terminal device (not illustrated) and the electronic device 100. Here, the short range communication module 141 may include at least one of a Bluetooth module, an infrared data association (IrDA) module, a near field communication (NFC) module, a WIFI module, and a Zigbee module.

Further, the wireless communication module 143 is a module that is connected to an external network according to a wireless communication protocol such as IEEE to perform communications. In addition, the wireless communication module may further include a mobile communication module which is connected to a mobile communication network according to various mobile communication standards such as 3rd generation (3G), 3rd generation partnership project (3GPP), and long term evolution (LTE) to perform communications.

As such, the communicator 140 may be implemented by the above-mentioned various short range communication schemes and may adopt other communication technologies not mentioned in the present specification as needed.

Meanwhile, the connector 145 is configured to provide an interface with various source devices such as USB 2.0, USB 3.0, HDMI, and IEEE 1394. The connector 145 may receive content data transmitted from an external server (not illustrated) through a wired cable connected to the connector 145 according to the control command of the processor 130 to be described below or may transmit pre-stored content data to an external recording medium. Further, the connector 145 may receive power from a power source through the wired cable physically connected to the connector 145.

The speech processor 150 is configured to perform the speech recognition on the uttered speech section of the user among the audio signals input through the plurality of microphones 111. In detail, the speech processor 150 performs a pre-processing process of amplifying the plurality of audio signals included in the detected speech section when the speech section is detected from the input audio signals and attenuating the rest audio signals that are noise signals, according to the control command of the processor 130. Next, the speech processor 150 may perform the speech recognition on the uttered speech of the user using a speech recognition algorithm like the STT algorithm for the speech sections in which the audio signals are amplified.

The photographer 160 is to photograph still images or moving images according to the user command and may be implemented in plural like a front camera and a rear camera.

The sensor 170 senses various operation states of the electronic device 100 and a user interaction. In particular, the sensor 170 may sense a gripped state in which the user grips the electronic device 100. In detail, the electronic device 100 may be rotated or inclined in various directions. In this case, the sensor 170 may use at least one of various sensors such as a geomagnetic sensor, a gyro sensor, and an accelerator sensor to sense a gradient, etc., of the electronic device 100 that is gripped by the user based on a rotational motion or a gravity direction.

The signal processor 180 may be configured to process the content received through the communicator 140 and image data and audio data of the content stored in the memory 120. In detail, the signal processor 180 may perform various image processing, such as decoding, scaling, noise filtering, frame rate conversion, and resolution conversion, on the image data included in the content. Further, the signal processor 180 may perform various audio signal processing, such as decoding, amplification, and noise filtering, on the audio data included in the content.

The output 190 outputs the signal-processed content through the signal processor 180. The output 190 may output the content through at least one of the display 191 and an audio output 192. That is, the display 191 may display the image data that are image processed by the signal processor 180 and the audio output 192 may output the audio data, which suffer from audio signal processing, in an audible sound form.

Meanwhile, the display 191 that displays the image data may be implemented as a liquid crystal display (LCD), an organic light emitting display (OLED), a plasma display panel (PDP), or the like. In particular, the display 191 may be implemented in a touch screen form in which it forms a mutual layer structure with the touch input 115.

Meanwhile, the foregoing processor 130 may include a CPU 131, a ROM 132, a RAM 133, and a GPU 135 that may be connected to one another via a bus 137.

The CPU 131 accesses the memory 120 to perform booting using an O/S stored in the memory 120. Further, the CPU 131 performs various operations using various programs, content, data, and the like that are stored in the memory 120.

A set of commands for system booting, and the like are stored in the ROM 132. When a turn on command is input and thus power is supplied, the CPU 131 copies the O/S stored in the memory 120 to the RAM 133 according to the command stored in the ROM 132 and executes the O/S to boot the system. If the booting is completed, the CPU 131 copies the various programs stored in the memory 120 to the RAM 133 and executes the programs copied to the RAM 133 to execute various operations.

The GPU 135 generates a display screen including various objects like an icon, an image, a text, or the like. In detail, the GPU 135 calculates attribute values, such as coordinate values at which the respective objects will be displayed, shapes, sizes, and colors of the objects, based on a layout of the screen according to the received control command and generates display screens having various layouts including the objects based on the calculated attribute values.

The processor 130 may be implemented as a system-on-a chip (SOC) or a system on chip (Soc) by being combined with various components such as the input 110, the communicator 140, and the sensor 170 that are described above.

Meanwhile, the operation of the processor 130 may be executed by programs that are stored in the memory 120. Here, the memory 120 may be implemented as at least one of a memory card (for example, SD card, memory stick) that may be detached from and attached to the ROM 132, the RAM 133, or the electronic device 100, a non-volatile memory, a volatile memory, a hard disk drive (HDD), and a solid state drive (SSD).

Figure 3:
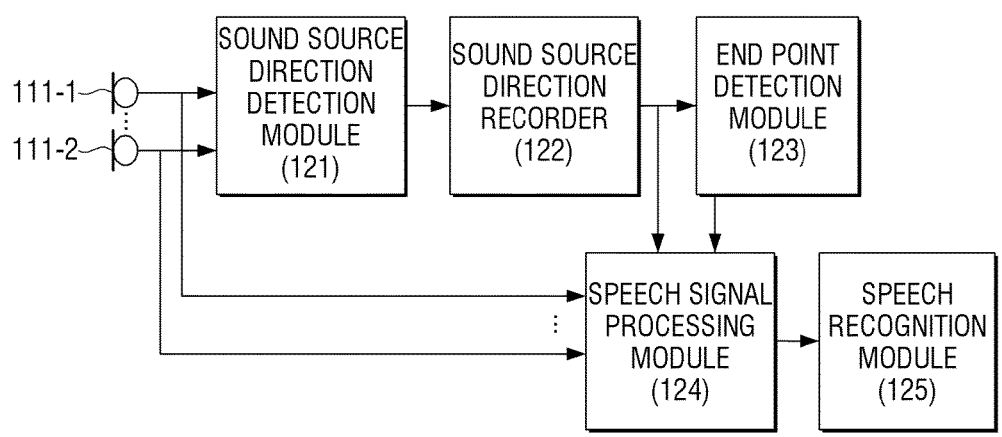
FIG. 3 is a block diagram illustrating a configuration of performing speech recognition in a processor according to an exemplary embodiment of the present disclosure.

Meanwhile, as described above, the processor 130 that detects the speech sections from the plurality of audio signals may detect the speech sections from the plurality of audio signals using the program module stored in the memory 120 as illustrated in FIG. 3.

FIG. 3 is a block diagram illustrating a configuration of performing speech recognition in a processor according to an exemplary embodiment of the present disclosure.

As illustrated in FIG. 3, the processor 130 may include a sound source direction detection module 121, a sound source direction recorder 12, an end point detection module 123, a speech signal processing module 124, and a speech recognition module 125.

If a plurality of signal-processed audio signals are input from sounds input through a plurality of microphones 111-1 and 111-2 or the microphone 111 including a plurality of microphone arrays, the sound source direction detection module 121 may calculate a maximum power value and a minimum power value from each of the plurality of audio signals and acquire the direction information on the sound sources from which the sounds corresponding to each of the plurality of audio signals are generated and indexes for the plurality of audio signals based on the calculated maximum power value and minimum power value.

Figure 4:
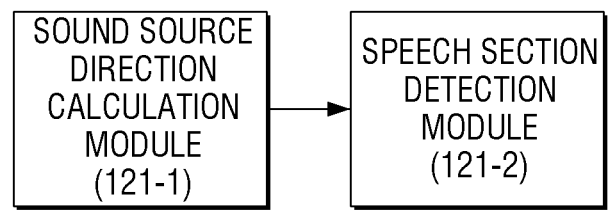
FIG. 4 is a detailed block diagram of a sound source direction detection module according to an exemplary embodiment of the present disclosure.

FIG. 4 is a detailed block diagram of the sound source direction detection module according to an exemplary embodiment of the present disclosure.

As illustrated in FIG. 4, the sound source direction detection module 121 includes a sound source direction calculation module 121-1 and a speech section detection module 121-2.

The sound source direction calculation module 121-1 calculates $N*(N-1)/2$ power values and delay values for each of the plurality of audio signals from the audio signals input through the plurality of microphones 111-1 and 111-2 based on a cross-correlation function.

The speech section detection module 121-2 acquires a maximum power value among the calculated power values and the delay value corresponding to the maximum power value from the sound source direction calculation module 121-1. Next, the speech section detection module 121-2 calculates the minimum power value from the plurality of audio signals using an MCRA algorithm. Here, the maximum power value and the minimum power value may be signal strength values for the audio signals.

If the minimum power value is calculated, the speech section detection module 121-2 compares the calculated minimum power value with the pre-stored minimum power value to select a minimum power value having a smaller size and calculates a power ratio from the selected minimum power value and the maximum power value calculated from the plurality of audio signals. Next, the speech section detection module 121-2 compares the power ratio calculated from the maximum power value and the minimum power value with the preset threshold value to detect audio signals having the power ratio that is equal to or more than the preset threshold value and outputs the direction information on the sound source for the audio signal and the index for the audio signal from the detected audio signals.

Therefore, the sound source direction recorder 122 may record the direction information on the sound source for the audio signal and the index for the audio signal that are output through the speech section detection module 121-2 in the memory 120.

If the direction information on the sound source for at least one of the plurality of audio signals and the index for at least one of the plurality of audio signals are recorded in the memory 120 by the series of execution operations, the end point detection module 123 may determine the starting and ending points of the speech section included in the audio signal based on the direction information on the sound source recorded in the memory 120. As described above, the direction information on the sound source recorded in the memory 120 may be the angle information between a sound direction of the sound sources from which the sounds corresponding to each of the plurality of audio signals are generated and the plurality of microphones 111-1 and 111-2.

Therefore, the end point detection module 123 determines whether the angle information on each of the plurality of audio signals pre-stored in the memory 120 is included in the preset error range and if at least two angle information included in the preset error range is acquired, determines audio signals corresponding to the acquired angle information as speech signals from a static sound source.

Meanwhile, if a difference in the angle information of each of the first and second audio signals among the plurality of pre-stored audio signals is not included in the preset error range, the end point detection module 123 may determine the first and second audio signals as speech signals from a dynamic sound source depending on whether a difference value of the angle information of each of the first and second audio signals is less than the preset threshold value.

If it is determined that at least two of the plurality of audio signals pre-stored in the memory 120 are the speech signal by the various analyses, the end point detection module 123 may determine each of at least two audio signals determined as the speech signal as the audio signals of the starting and ending points.

If the audio signals of the starting and ending points are determined, the speech signal processing module 124 detects the speech sections based on the indexes for the audio signals determined as the starting and ending points. Next, the speech signal processing module 124 performs the signal processing to amplify the audio signal in the direction corresponding to the direction information on the sound sources for the audio signals determined as the starting and ending points and attenuate the audio signals in the rest directions. Therefore, the speech recognition module 125 may perform the speech recognition from the audio signal in the speech section that is signal-processed by the speech signal processing module 124 to transform the speech signal for the uttered speech of the user into the text.

As such, the electronic device 100 according to the exemplary embodiment of the present disclosure may detect the section having the power ratio equal to or more than the preset threshold value as the speech section based on the power ratio calculated from the plurality of audio signals, thereby accurately detecting the speech section for the uttered speech of the user even in the environment that a lot of noise is present. Further, the electronic device 100 according to the exemplary embodiment of the present disclosure performs the speech recognition only in the detected speech section, thereby more minimizing the computation required to perform the speech recognition than before.

Figure 5A:
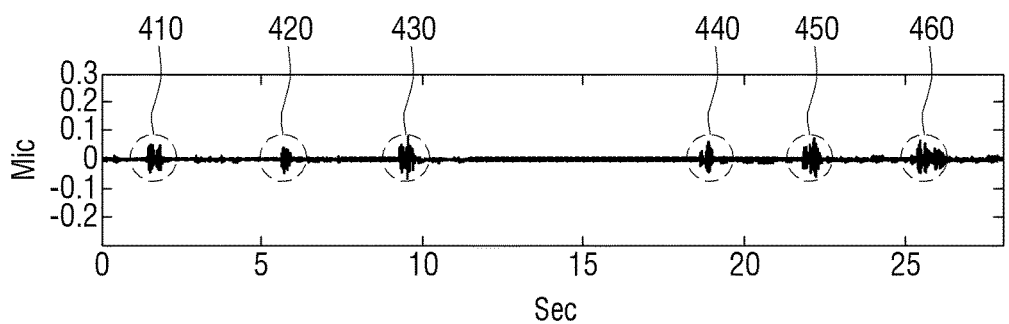
FIGS. 5A to 5C are exemplified diagrams illustrating a speech section detection from an input audio signal in the electronic device according to an exemplary embodiment of the present disclosure.
Figure 5B:
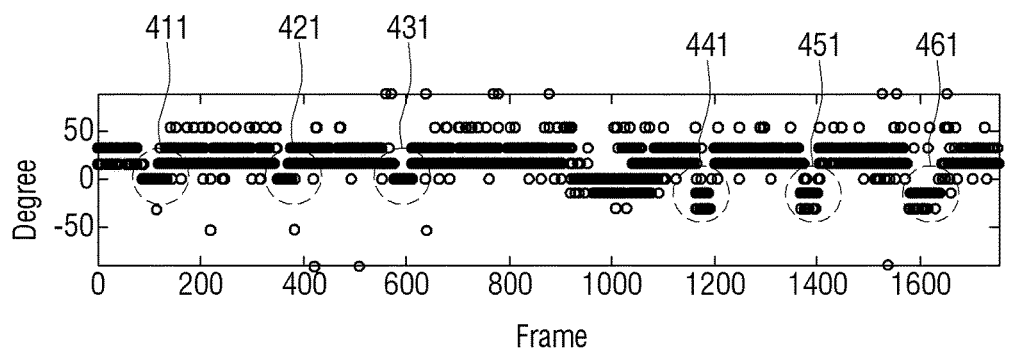
Figure 5C:
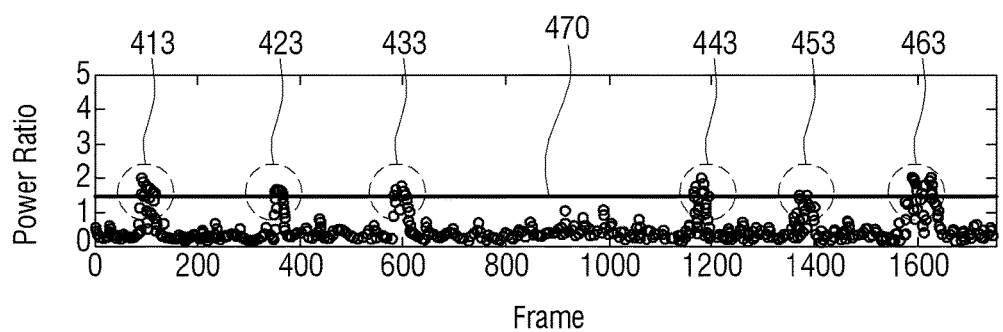

FIGS. 5A to 5C are exemplified diagrams illustrating a speech section detection from an input audio signal in the electronic device according to an exemplary embodiment of the present disclosure.

As illustrated in FIG. 5A, the sounds including the speech signal may be received through the plurality of microphones 111. Here, sections A to F 410 to 460 may be the speech section including the speech signal and the rest sections may be the noise section including the noise signal.

In detail, if the sounds generated from the sound source are input from the plurality of microphones 111, the electronic device 100 performs the signal processing on each of the input sounds. Next, the electronic device 100 calculates the maximum power value and the minimum power value from each of the plurality of audio signals that are signal-processed, and calculates the power ratio from the calculated maximum power value and minimum power value.

As illustrated in FIG. 5B, a power ratio of sections A' to F' 411 to 461 corresponding to the sections A to F 410 to 460 may be equal to or more than a preset threshold value 470. Therefore, the electronic device 100 may detect the sections A' to F' 411 to 461 having the power ratio equal to or more than the preset threshold value 470 as the speech sections.

Meanwhile, as illustrated in FIG. 5C, angles of each audio signal of sections A" to F" 413 to 463 corresponding to the sections A' to F' 411 to 461 as the speech sections are present within the preset error range and angles of other sections may be present outside the preset error range. In this case, as illustrated in FIG. 6 to be described below, the electronic device 100 may amplify only the audio signals in the directions corresponding to the angles present within the error range among the audio signals in the speech sections that are the sections A' to F' 411 to 461 having the power ratio equal to or more than the preset threshold value 470.

FIG. 6, including 6A and 6B, is an exemplified diagram illustrating a result of tracking a sound source direction from the input audio signal in the electronic device according to an exemplary embodiment of the present disclosure.

Referring to FIG. 5, including 5A to 5C, the speech section may be detected from the audio signals input through the plurality of microphones 111.

If the speech section is detected from the audio signals, the electronic device 100 may perform the signal processing to amplify an audio signal in a specific direction among the audio signals in the speech section detected from the audio signals and attenuate audio signals in the rest directions.

In detail, the electronic device 100 amplifies the audio signal in the direction corresponding to the corresponding angle information among the audio signals in the previously detected speech section based on the angle information on the sound sources for at least two audio signals determined as the starting and ending points among the plurality of audio signals having the power ratio equal to or more than the preset threshold value. Further, the electronic device 100 attenuates the audio signals in the rest directions other than the audio signal in the direction corresponding to the corresponding angle information among the audio signals in the previously detected speech section.

Figure 6A:
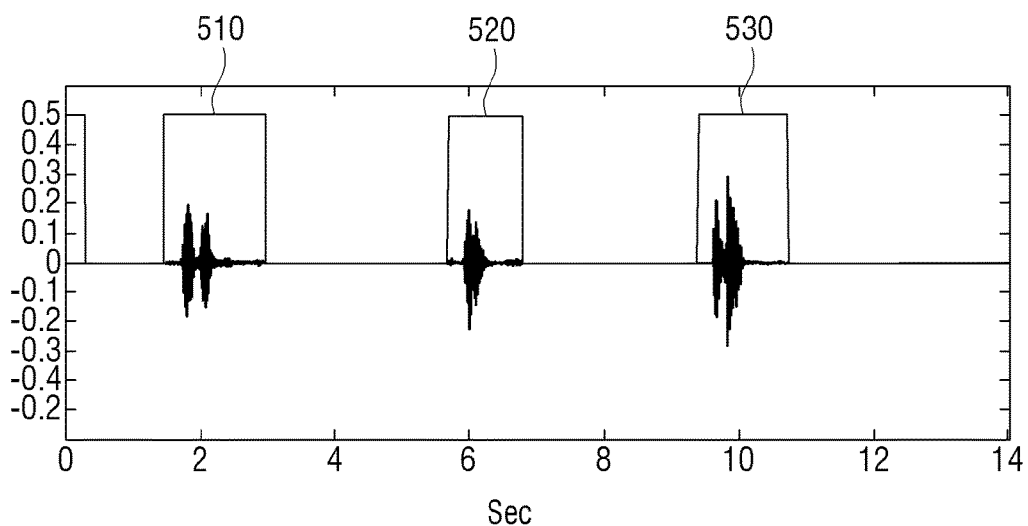
FIGS. 6A and 6B are exemplified diagram illustrating a result of tracking a sound source direction from the input audio signal in the electronic device according to an exemplary embodiment of the present disclosure.
Figure 6B:
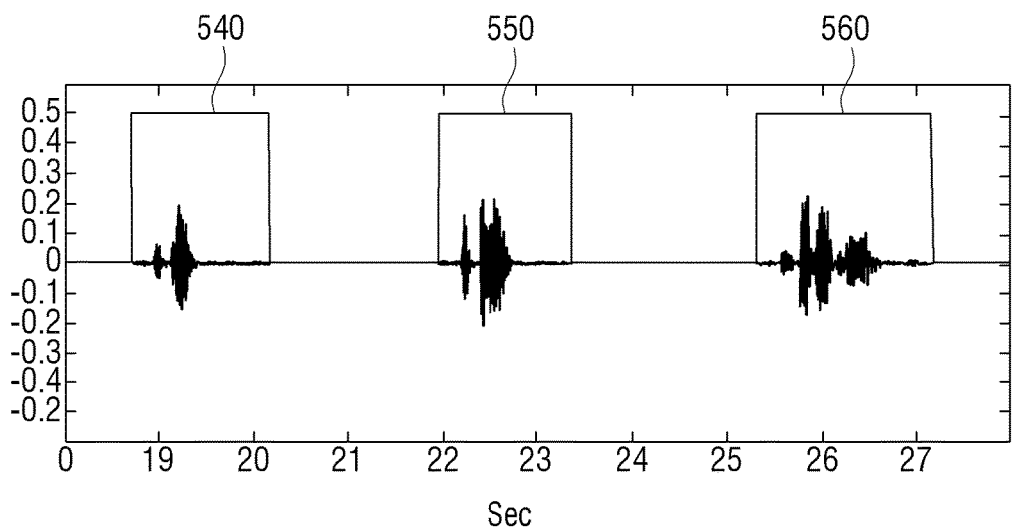

Therefore, as illustrated in FIGS. 6A and 6B, the electronic device 100 may amplify audio signals in speech processing sections 510 to 560 corresponding to the sections A to F 410 to 460 detected as the speech section and attenuate audio signals in the rest sections.

Meanwhile, the electronic device 100 according to the exemplary embodiment of the present disclosure may provide various internet of things services based on the foregoing exemplary embodiments.

Figure 7:
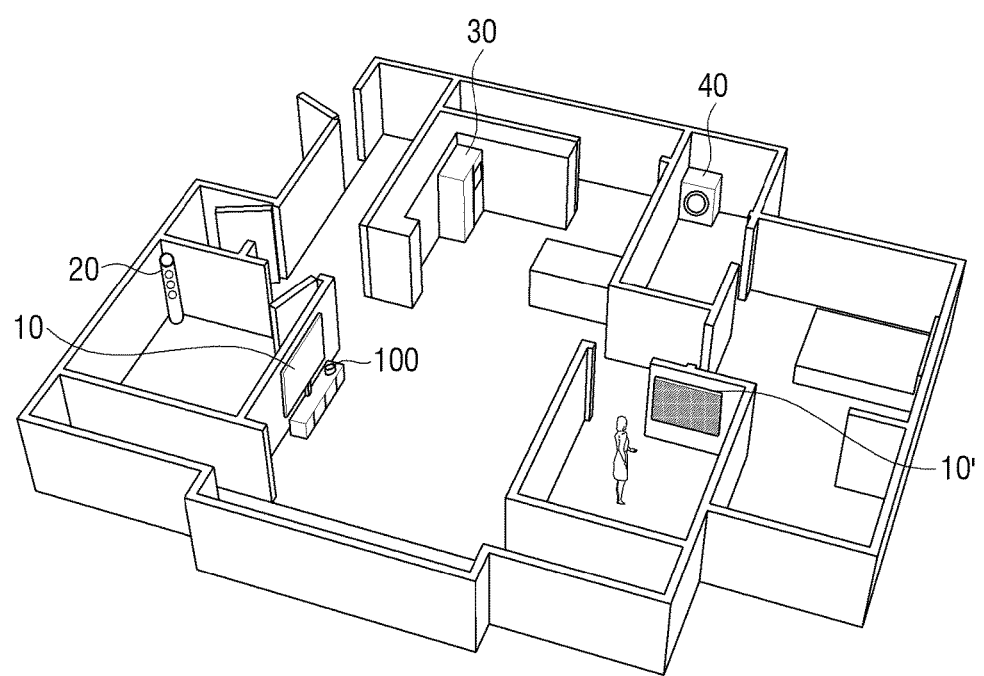
FIG. 7 is an exemplified diagram of internet of things services provided from the electronic device according to the exemplary embodiment of the present disclosure.

FIG. 7 is an exemplified diagram of internet of things services provided from the electronic device according to the exemplary embodiment of the present disclosure.

As illustrated in FIG. 7, the electronic device 100 may perform the speech recognition from the speech signal for the uttered speech of the user and control home appliances such as first and second TVs 10 and 10', an air conditioner 20, a refrigerator 30, and a washing machine 40 in the house based on the recognized speech command.

For example, the user may utter a speech command 'turn on the TV!' in his/her own room. If the speech command of the user is uttered, the electronic device 100 receives sounds generated from sound sources including speech signals corresponding to the speech commands of the user through the plurality of microphones and performs signal processing on each of the input sounds.

Next, the electronic device 100 understands directions in which the speech commands of the user are uttered based on the series of performance operations as described above. Next, the electronic device 100 identifies home appliances associated with the directions in which the speech commands of the user are uttered based on the pre-stored direction information on each home appliance.

In detail, the electronic device 100 may store the identification information corresponding to the first and second TVs 10 and 10', the air conditioner 20, the refrigerator 30, and the washing machine 40, respectively and the direction information on each home appliance. Therefore, the electronic device 100 may compare the direction in which the speech command of the user is uttered with the pre-stored direction information on each home appliance to detect the direction in which the speech command of the user is uttered and the home appliances present within the preset range.

As the foregoing example, the first TV 10 is located in a living room and the second TV 10' may be located in a room in which the user is currently located. Further, the home appliances present in the direction in which the speech command of the user is uttered and within the preset range may be the second TV 10'. In this case, the electronic device 100 may transmit a power on control signal to the second TV 10' in the room in which the user is currently located among the first and second TVs 10 and 10' based on the speech command of the user.

Therefore, the second TV 10' may perform a power on operation based on the power on control signal received from the electronic device 100 to watch broadcasting through the second TV 10' present in the room in which the user is currently located.

Hereinafter, a method for performing speech recognition by the electronic device 100 according to the exemplary embodiment of the present disclosure will be described in detail.

Figure 8:
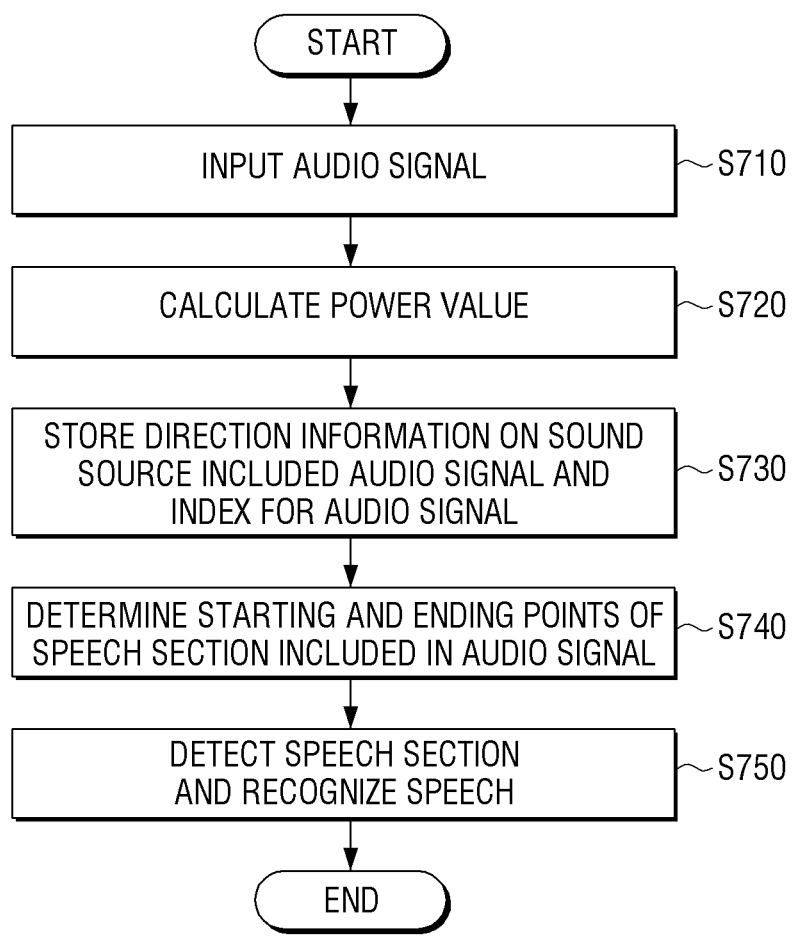
FIG. 8 is a flow chart of a method for performing speech recognition by an electronic device according to an exemplary embodiment of the present disclosure.

FIG. 8 is a flow chart of a method for performing speech recognition by an electronic device according to an exemplary embodiment of the present disclosure.

As illustrated in FIG. 8, if the sounds generated from the sound sources are input through the plurality of microphones, the electronic device 100 performs the signal processing on each of the input sounds to generate the plurality of signal-processed audio signals (S710). In detail, if the sounds generated from the sound sources are input through the plurality of microphones, the electronic device 100 performs the signal processing on each of the input sounds to generate the plurality of signal-processed audio signals. Next, the electronic device 100 may sample each of the signal-processed audio signals in L numbers and then generate the L sampled audio signals in a frame unit. If or when the plurality of audio signals are generated, the electronic device 100 calculates the power values from each of the plurality of audio signals (S720). Next, the electronic device 100 stores the direction information on the sound source from which the sound corresponding to at least one of the plurality of audio signals is generated and the index for at least one audio signal based on the power values calculated from the plurality of audio signals (S730).

Next, the electronic device 100 determines the starting and ending points of the speech sections included in all the audio signals based on the direction information on the pre-stored sound source (S740).

According to the exemplary embodiment of the present disclosure, when the direction information on the sound sources for each of the plurality of sound sources is stored in the memory 120, the electronic device 100 may determine each of the audio signals corresponding to at least two direction information as the audio signals of the starting and ending points if at least two direction information among the plurality of direction information is included in the preset error range or the error range of the at least two direction information is less than the preset threshold value.

Next, the electronic device 100 detects the speech sections from all the audio signals based on the indexes for the audio signals corresponding to the starting and ending points and performs the speech recognition on the detected speech section (S750).

In detail, the electronic device 100 may detect the speech sections including the speech signals among all the audio signals based on the indexes for the audio signals corresponding to the starting and ending points. Next, the electronic device 100 performs the preprocessing process of amplifying the plurality of audio signals included in the speech sections and attenuating the rest audio signals that are noise signals.

According to the exemplary embodiment of the present disclosure, the electronic device 100 may perform signal processing to amplify the audio signal in the direction corresponding to the direction information on the sound sources for the audio signals determined as the starting and ending points from the audio signal in the previously detected speech section and attenuate the audio signals in the rest directions by at least one of a beam-forming scheme including at least one of linearly constrained minimum variance (LCMA) and minimum variance distortion-less response (MVDR), a geometric source separation (GSS) scheme, and a blind source extraction (BSE) scheme.

Next, the electronic device 100 may perform the speech recognition on the uttered speech of the user using a speech recognition algorithm like the STT algorithm for the speech sections in which the audio signals are amplified.

Hereinafter, for the electronic device 100 to detect the audio signals of the starting and ending points of the speech section from the audio signal, a method for storing direction information on a sound source for at least one audio signal detected as a speech section and an index for at least one audio signal will be described in detail.

Figure 9:
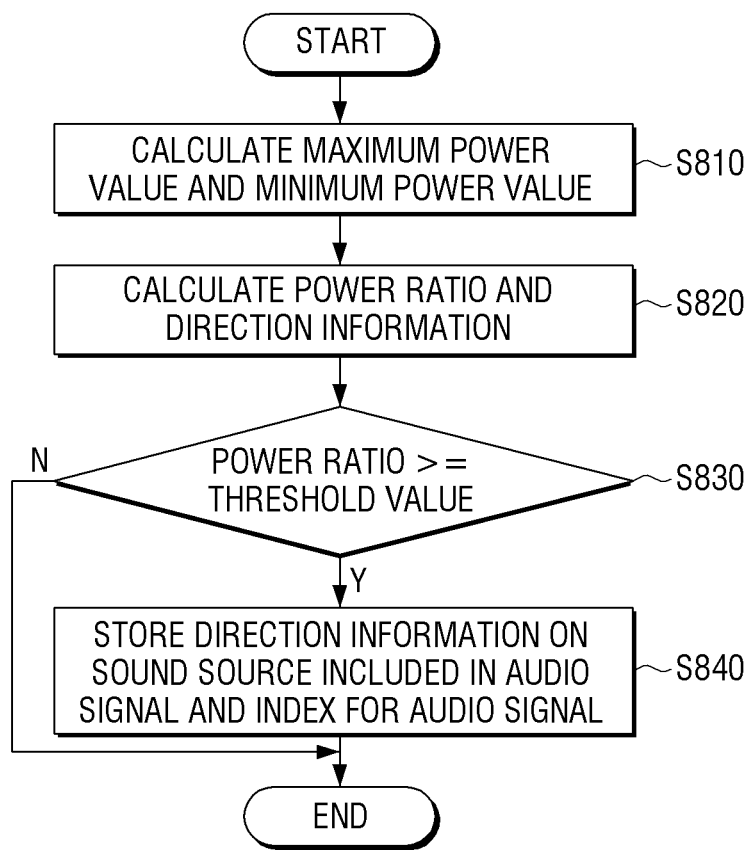
FIG. 9 is a first flow chart of a method for storing direction information on a sound source for at least one audio signal determined as a speech section and an index for at least one audio signal, by the electronic device according to an exemplary embodiment of the present disclosure.

FIG. 9 is a first flow chart of a method for storing direction information on a sound source for at least one audio signal determined as a speech section and an index for at least one audio signal, by the electronic device according to an exemplary embodiment of the present disclosure.

As illustrated in FIG. 9, if the plurality of signal-processed audio signals are generated from the sounds input from the plurality of microphones, the electronic device 100 calculates the maximum power value and the minimum power value from each of the plurality of audio signals (S810). Next, the electronic device 100 calculates the power ratio from the calculated maximum power value and minimum power value (S820). Next, the electronic device 100 determines at least one audio signal of which the calculated power ratio is equal to or more than the preset threshold value among the plurality of audio signals and stores the direction information on the sound source for at least one audio signal determined and the index for at least one audio signal (S830 and S840).

In detail, when the number of microphones is N, the electronic device 100 calculates N*(N−1)/2 power values from the plurality of audio signals using the generalized cross-correlation phase transform (GCC-PHAT) algorithm. Next, the electronic device 100 may determine the largest value among the calculated N*(N−1)/2 power values as the maximum power value.

According to the exemplary embodiment of the present disclosure, the electronic device 100 may calculate the N*(N−1)/2 power values from the plurality of audio signals and delay values for each of the plurality of audio signals using the cross-correlation function like the above <Equation 1>. Here, the delay values for each of the plurality of audio signals may be the information on the time when the audio signals are differently input to each of the plurality of microphones depending on the distance between the plurality of microphones. Therefore, the electronic device 100 may calculate the direction information on the sound source for the plurality of audio signals from the delay values for each of the plurality of frames.

Here, the direction information is the angle information between the sound direction of the sound sources for the plurality of audio signals and the plurality of microphones 111. Therefore, the electronic device 100 may calculate the angle information that is the direction information on the sound source for the plurality of audio signals from the delay values calculated from the above <Equation 1>.

Meanwhile, the electronic device 100 may calculate the minimum power value from the plurality of audio signals using minima-controlled recursive average (MCRA) algorithm. Therefore, the electronic device 100 may calculate the power ratio from the maximum power value having the largest value among the power values calculated using the cross-correlation function like the above <Equation 1> and the minimum power value calculated using the MCRA algorithm. If the power ratio is calculated, the electronic device 100 may store the direction information on the sound source for at least one audio signal having the power ratio equal to or more than the preset threshold value by comparing the previously calculated power ratio with the preset threshold value and the index for at least one audio signal, among the plurality of audio signals.

Meanwhile, the electronic device 100 may store the minimum power value using the minima-controlled recursive average (MCRA) algorithm. Therefore, if the minimum power value is stored and then the audio signal is input, the electronic device 100 may compare the minimum power value calculated from the input audio signal with the pre-stored minimum power value to calculate the power ratio based on the lower value of the two minimum power values.

Hereinafter, a method for storing, by an electronic device 100, direction information on a sound source for at least one audio signal determined as a speech section and an index for at least one audio signal determined as the speech section in the state in which the minimum power value is pre-stored will be described in detail.

Figure 10:
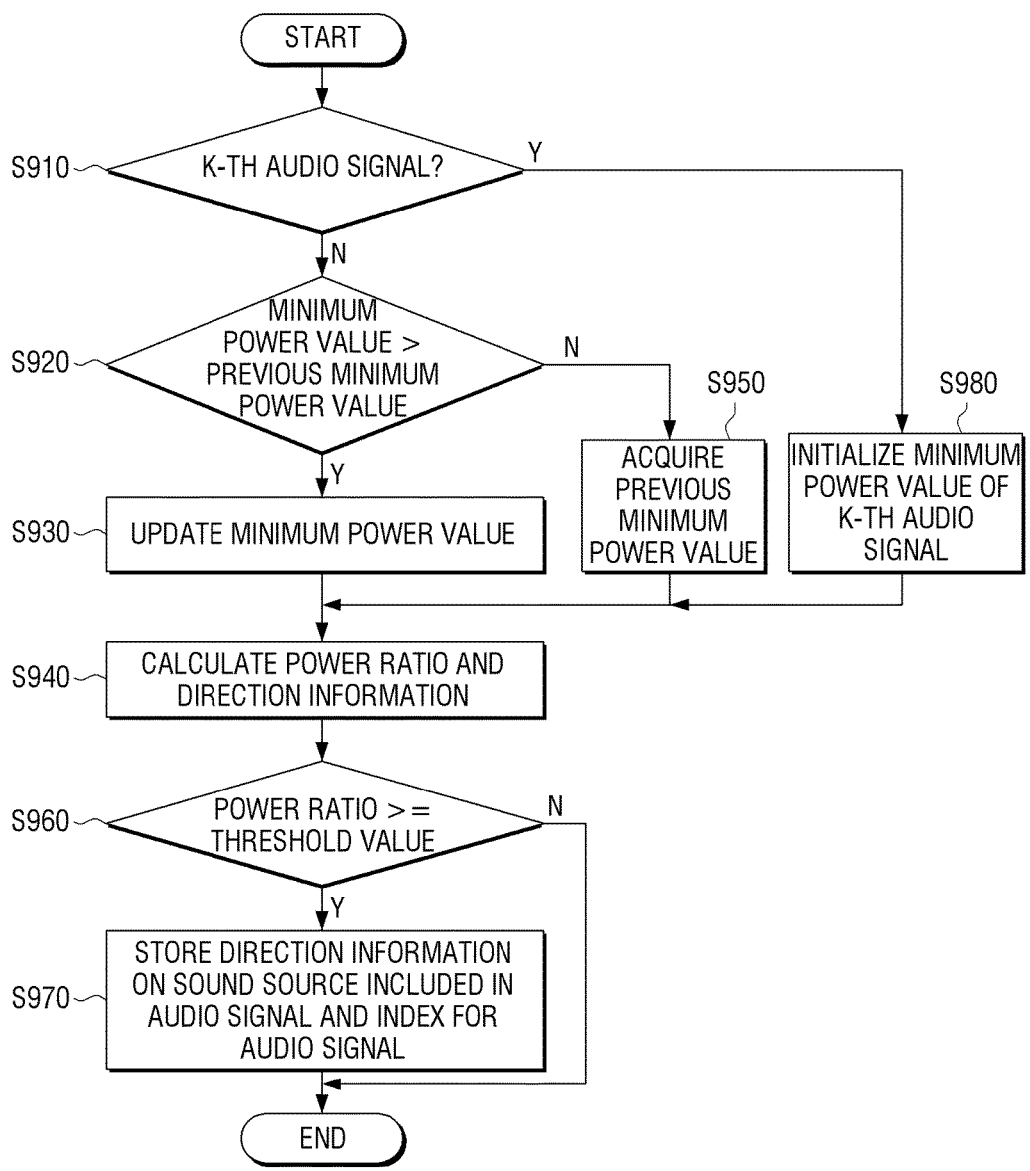
FIG. 10 is a second flow chart of a method for storing direction information on a sound source for at least one audio signal determined as a speech section and an index for at least one audio signal determined as the speech section, by an electronic device according to another exemplary embodiment of the present disclosure.

FIG. 10 is a second flow chart of a method for storing, by the electronic device according to another exemplary embodiment of the present disclosure, direction information on a sound source for at least one audio signal determined as a speech section and an index for at least one audio signal determined as the speech section.

As illustrated in FIG. 10, if the plurality of signal-processed audio signals are generated from the sounds input through the plurality of microphones, the electronic device 100 determines whether the plurality of audio signals are the predefined K-th audio signal (S910). As the determination result, if the plurality of audio signals are not the predefined K-th audio signal, the electronic device 100 calculates the maximum power value and the minimum power value from the plurality of audio signals and compares the calculated minimum power value with the previous minimum power value pre-stored in the memory as described with reference to FIG. 9 (S920). As the comparison result, if the currently calculated minimum power value is smaller than the minimum power value pre-stored in the memory, the electronic device 100 updates the minimum power value pre-stored in the memory to the minimum power value calculated from the plurality of audio signals (S930).

Next, the electronic device 100 calculates the power ratio and the direction information from the previously calculated maximum power value and minimum power value (S940). The method for calculating a power ratio and direction information from a plurality of audio signals is already described in detail with reference to FIG. 9 and therefore the detailed description thereof will be omitted.

Meanwhile, as the comparison result in the foregoing step S920, if the pre-stored previous minimum power value is smaller than the calculated minimum power value, the electronic device 100 determines the previous minimum power value as the value for calculating the power ratio S950. Next, the electronic device 100 may calculate the power ratio and the direction information from the maximum power value calculated from the plurality of audio signals and the previous minimum power value pre-stored in the memory, based on the foregoing step S940.

As such, if the power ratio is calculated from the plurality of audio signals, the electronic device 100 may store the direction information on the sound source for at least one audio signal having the power ratio equal to or more than the preset threshold value by comparing the calculated power ratio with the preset threshold value and the index for at least one audio signal having the power ratio equal to or more than the preset threshold value, among the plurality of audio signals (S960 and S970).

Meanwhile, if the plurality of audio signals are the predefined K-th audio signal in the foregoing step S910, the electronic device 100 resets the minimum power value calculated from the K-th audio signal to be the initial value and stores it in the memory S980 and then performs the operations of the foregoing steps S940 to S970. As such, if the direction information on the sound source for at least one audio signal and the index for at least one audio signal are stored in the memory, as illustrated in FIG. 8, in the electronic device 100, the starting and ending points of the speech sections included in all the audio signals may be determined based on the direction information on the sound sources for the plurality of audio signals pre-stored in the memory and the speech sections included in all the audio signals may be detected based on the index information on the audio signals corresponding to the starting and ending points determined.

Next, the electronic device 100 may perform the preprocessing process of amplifying the plurality of audio signals included in the speech section and attenuating the rest audio signals that are noise signals and then perform the speech recognition on the uttered speech of the user using the speech recognition algorithm like the STT algorithm in the speech section in which the audio signal is amplified. Meanwhile, the electronic device 100 according to the exemplary embodiment of the present disclosure preferably performs repeatedly each of the steps of FIGS. 8 to 10 as described above until events such as power off and deactivation of a speech recognition mode are generated.

Meanwhile, the method for recognizing a speech by an electronic device 100 according to the exemplary embodiment of the present disclosure may be implemented by at least one execution program for performing the speech recognition as described above, in which the execution program may be stored in a non-transitory computer readable medium or storage.

A non-transitory computer readable medium, as can be used herein, is not a medium that stores data therein for a while, such as a register, a cache, a memory, or the like, but means a medium that semi-permanently stores data therein and is readable by a device. In detail, the foregoing programs may be stored in various types of recording media that are readable by a terminal, such as a random access memory (RAM), a flash memory, a read only memory (ROM), an erasable programmable ROM (EPROM), an electronically erasable programmable ROM (EEPROM), a register, a hard disk, a removable disk, a memory card, a universal serial bus (USB) memory, a compact-disk (CD) ROM, and the like.

Hereinabove, the present disclosure has been described with reference to exemplary embodiments thereof.

Hereinabove, the exemplary embodiments of the present disclosure are illustrated and described, but the present disclosure is not limited to the foregoing specific exemplary embodiments and therefore it is apparent that various modifications can be made by those skilled in the art without departing from the spirit of the present disclosure described in the appended claims and these various modifications should not be individually construed from the technical ideas or prospects of the present disclosure.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A method for recognizing voice by an electronic device, comprising:
    receiving a plurality of audio signals generated from a sound source through a plurality of microphones;
    obtaining a power ratio based on a power value for each of the plurality of audio signals;
    obtaining first and second direction information for the sound source corresponding to first and second audio signals from among the plurality of audio signals;
    identifying a speech section based on difference information between the first and the second direction information and the obtained power ratio;
    processing an audio signal among the audio signals included in the identified speech section;
    performing a speech recognition on the processed audio signal included in the identified speech section; and
    controlling the electronic device to perform a function corresponding to a result of the speech section,
    wherein the identifying the speech section identifies, based on the difference between the first and the second direction information being less than a threshold, a starting point and an ending point of the speech section from the first audio signal and the second audio signal, respectively, and
    wherein the processing the audio signal processes the audio signal using at least one of a beam forming scheme, a geometric source separation (GSS) scheme or a blind source extraction (BSE) scheme.

2. The method of claim 1, wherein the obtaining the power ratio includes obtaining the power ratio based on a maximum power value and a minimum power value for each of the plurality of audio signals, and wherein the method further includes:
  comparing the minimum power value obtained from the plurality of audio signals with a pre-stored minimum power value to determine a determined power value having a smaller size as the minimum power value for the plurality of audio signals, when the minimum power value obtained from a previous audio signal is pre-stored.

3. The method of claim 2, wherein the method further includes:
  resetting the minimum power value obtained from a K-th audio signal to an initial value, when a predefined K-th audio signal is received.

4. The method of claim 2, wherein in the obtaining the power ratio, N*(N−1)/2 power values are calculated from the plurality of audio signals using a generalized cross-correlation phase transform (GCC-PHAT) algorithm, a largest value among the N*(N−1)/2 power values is determined as the maximum power value, when a number of microphones is N, and
  the minimum power value is obtained from the plurality of audio signals using a minima-controlled recursive average (MCRA) algorithm.

5. The method of claim 4, wherein the first and second direction information is angle information between sound direction of the sound source from which the sound corresponding to each of the first and second of audio signals is generated and the plurality of microphones, and
  in the obtaining of the maximum power value and the minimum power value, the first and second direction information is calculated from a delay value corresponding to the maximum power value.

6. The method of claim 1, wherein the beam forming scheme includes at least one of linearly constrained minimum variance (LCMA) or minimum variance distortionless response (MVDR).

7. An electronic device, comprising:
  a memory; and
  a processor is configured to:
  based on receiving a plurality of audio signals generated from a sound source through a plurality of microphones, obtain a power ratio based on a power value for each of the plurality of audio signals,
  obtain first and second direction information for the sound source corresponding to first and second audio signals from among the plurality of audio signals
  identify a speech section based on difference information between the first and the second direction information and the obtained power ratio;
  process an audio signal among the audio signals included in the identified speech section;
  perform a speech recognition on the processed audio signal included in the identified speech section;
  control the electronic device to perform a function corresponding to a result of the speech section; and
  based on the difference between the first and the second direction information being less than a threshold, identify a starting point and an ending point of the speech section from the first audio signal and the second audio signal, respectively, and
  wherein the processing the audio signal processes the audio signal using at least one of a beam forming scheme, a geometric source separation (GSS) scheme or a blind source extraction (BSE) scheme.

8. The electronic device of claim 7, wherein the processor obtains the power ratio based on a maximum power value and a minimum power value for each of the plurality of audio signals and compares the minimum power value obtained from the plurality of audio signals with a pre-stored minimum power value to determine a determined power value having a smaller size as the minimum power value for the plurality of audio signals, when the minimum power value obtained from a previous audio signal is pre-stored in the memory.

9. The electronic device of claim 8, wherein the processor resets a minimum power value obtained from a K-th audio signal to an initial value, when a predefined K-th audio signal is received.

10. The electronic device of claim 7, wherein the processor calculates N*(N−1)/2 power values from the plurality of audio signals using a generalized cross-correlation phase transform (GCC-PHAT) algorithm, determines a largest value among the N*(N−1)/2 power values as the maximum power value, when the number of microphones is N, and
  calculates the minimum power value from the plurality of audio signals using a minima-controlled recursive average (MCRA) algorithm.

11. The electronic device of claim 10, wherein the first and second direction information is angle information between sound direction of the sound source from which sound corresponding to each of the first and second audio signals is generated and the plurality of microphones, and
  the processor obtains the first and second direction information from a delay value corresponding to the maximum power value.

12. The electronic device of claim 7, wherein the beam forming scheme includes at least one of linearly constrained minimum variance (LCMA) or minimum variance distortionless response (MVDR).

13. A non-transitory computer-readable medium storing computer instructions, which when executed by a processor of an apparatus, causes the apparatus to perform operations comprising:
  receiving a plurality of audio signals generated from a sound source through a plurality of microphones;
  obtaining a power ratio based on a power value for each of the plurality of audio signals;
  obtaining first and second direction information for the sound source corresponding to first and second audio signals from among the plurality of audio signals;
  identifying a speech section based on difference information between the first and the second direction information and the obtained power ratio;
  process an audio signal among the audio signals included in the identified speech section;
  performing a speech recognition on the processed audio signal included in the identified speech section; and
  controlling the apparatus to perform a function corresponding to a result of the speech section,
  wherein the identifying the speech section identifies, based on the difference between the first and the second direction information being less than a threshold, a starting point and an ending point of the speech section from the first audio signal and the second audio signal, respectively, and
  wherein the processing the audio signal processes the audio signal using at least one of a beam forming scheme, a geometric source separation (GSS) scheme or a blind source extraction (BSE) scheme.

* * * * *